United States Patent
Leister

(10) Patent No.: US 8,104,748 B2
(45) Date of Patent: Jan. 31, 2012

(54) HOLLOW FIBER SYSTEM

(75) Inventor: Klaus Leister, Weinheim (DE)

(73) Assignee: Carl Freudenberg KG, Weinheim (DE)

( * ) Notice: Subject to any disclaimer, the term of this patent is extended or adjusted under 35 U.S.C. 154(b) by 984 days.

(21) Appl. No.: 11/922,635

(22) PCT Filed: May 4, 2006

(86) PCT No.: PCT/EP2006/004147

§ 371 (c)(1),
(2), (4) Date: Dec. 20, 2007

(87) PCT Pub. No.: WO2006/136231

PCT Pub. Date: Dec. 28, 2006

(65) Prior Publication Data

US 2009/0115078 A1    May 7, 2009

(30) Foreign Application Priority Data

Jun. 20, 2005  (DE) .......................... 10 2005 028 718

(51) Int. Cl.
*B01D 53/22* (2006.01)
*B01D 63/04* (2006.01)

(52) U.S. Cl. ............................... 261/97; 96/8

(58) Field of Classification Search .............. 261/94, 261/97, 99, 104, 107, DIG. 15; 95/52; 96/8, 96/10; 210/500.23
See application file for complete search history.

(56) References Cited

U.S. PATENT DOCUMENTS

| | | | | |
|---|---|---|---|---|
| 4,293,418 A * | 10/1981 | Fujii et al. | ................ | 210/321.81 |
| 4,769,146 A * | 9/1988 | Schmidt | ................ | 210/321.8 |
| 4,911,846 A * | 3/1990 | Akasu et al. | ................ | 210/645 |
| 4,917,798 A | 4/1990 | Liou et al. | ................ | 210/321.89 |
| 5,198,110 A * | 3/1993 | Hanai et al. | ................ | 210/321.79 |
| 5,525,143 A * | 6/1996 | Morgan et al. | ................ | 95/52 |
| 5,779,897 A | 7/1998 | Kalthod et al. | ................ | 210/321.8 |
| 6,175,687 B1 * | 1/2001 | Imamura et al. | ................ | 392/395 |
| 6,210,464 B1 * | 4/2001 | Nakanishi et al. | ................ | 95/52 |
| 6,270,674 B1 * | 8/2001 | Baurmeister et al. | ................ | 210/649 |
| 2001/0009306 A1 | 7/2001 | Shimanuki et al. | ................ | 261/104 |
| 2002/0024155 A1 | 2/2002 | Kusano et al. | ................ | 261/104 |
| 2003/0209480 A1 | 11/2003 | Kneifel et al. | ................ | 210/321.8 |
| 2004/0211726 A1 | 10/2004 | Baig et al. | ................ | 210/640 |

FOREIGN PATENT DOCUMENTS

| | | |
|---|---|---|
| CA | 2191438 | 12/1995 |
| DE | 196 39 964 | 4/1998 |
| DE | 102 44 707 A1 | 4/2004 |
| EP | 0 335 760 | 10/1989 |
| EP | 0 515 034 | 11/1992 |
| EP | 0 585 614 | 3/1994 |
| EP | 1 360 984 | 11/2003 |
| JP | 05033975 | 2/1993 |
| JP | 2943224 | 8/1999 |
| WO | WO 2004/028671 | 4/2004 |

OTHER PUBLICATIONS

Machine generated English translation of JP 05-033975, published Feb. 1993.*
Machine generated English translation of DE 10244707 A1, published Apr. 2004.*

* cited by examiner

*Primary Examiner* — Frank Lawrence, Jr.
(74) *Attorney, Agent, or Firm* — Pearl Cohen Zedek Latzer, LLP

(57) ABSTRACT

Disclosed is a hollow fiber system for a humidifier, including hollow fibers that are permeable to steam. A first air flow can be conducted within the hollow fibers while a second air flow can be conducted outside the hollow fibers. The hollow fibers are located at least in part at a distance from each other via a device (6) that is disposed between the hollow fibers, respectively.

20 Claims, 5 Drawing Sheets

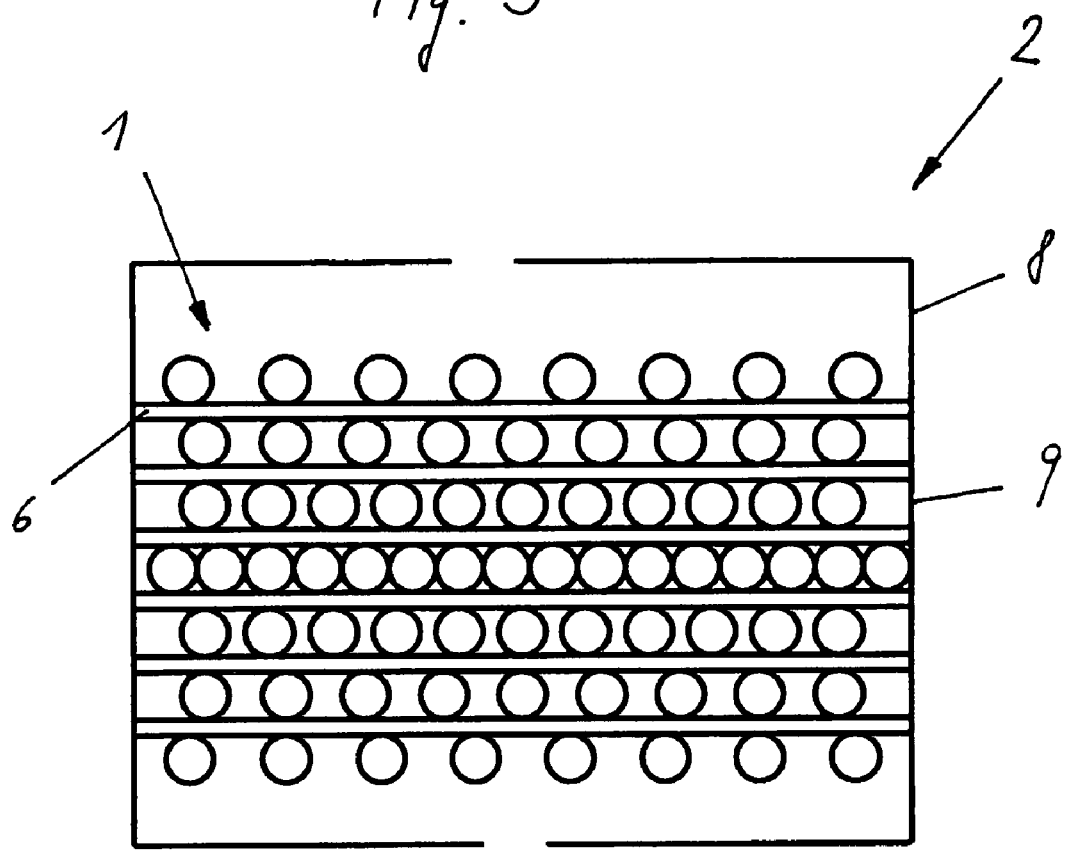

HOLLOW FIBER SYSTEM

This application is a national phase of International Application No. PCT/EP2006/004147, filed May 4, 2006, which claims priority to DE 10 2005 028 718.2, filed Jun. 20, 2005.

FIELD OF THE INVENTION

The invention relates to a hollow fiber arrangement for a humidifier, comprising hollow fibers that are permeable to water-vapor, whereby a first air stream can be conducted inside the hollow fibers and a second air stream can be conducted outside of the hollow fibers.

BACKGROUND

Such hollow fiber arrangements are generally known. The hollow fiber arrangements are disposed in humidifiers, whereby an air stream is conducted inside the fibers and another air stream is conducted outside of the fibers. In this context, one air stream is laden with water vapor that at least partially passes through the fibers into the other air stream. A problematic aspect of hollow fiber arrangements is that the air stream conducted on the outside causes the fibers to cluster together in some places and to move away from each other in other places. As a result, the air circulates unevenly around the fibers and a uniform mass transfer is no longer ensured.

SUMMARY OF THE INVENTION

The invention is based on the objective of providing a hollow fiber arrangement that exhibits a prescribed pressure loss during operation.

This objective is achieved by means of the features of the invention as described and claimed herein.

In order to achieve the objective, the hollow fibers are spaced at least in part at a distance from each other by a device arranged between the hollow fibers. The device configured as a spacer prevents the fibers from clustering together locally due to the effect of the flow and prevents areas with a lower packing density from being formed. The pressure loss can be varied by various configurations of the device and can be specified over wide operating ranges. The hollow fibers can be arranged and secured by the device in such a way as to result in a constant pressure loss over the inflow area. This is particularly important in the case of asymmetrical inflows with which different dynamic pressures occur in the inflow area. In a first embodiment, the device can be in the form of a yarn whose diameter defines the distance between the fibers.

The device can comprise a nonwoven. In this case, the nonwovens are configured in such a permeable manner that they display a low pressure loss. Nonwovens are easy to process. Due to their flexibility, the nonwovens can be adapted to numerous geometries.

The device can comprise an open-cell foam. The open-cell foam can be in the form of a polyurethane foam. Foams are dimensionally stable, as a result of which the structure of the hollow fiber arrangement is stabilized. The foam entails a slight pressure loss.

The device can comprise a material that surrounds the hollow fibers like a spiral. For instance, the material can be a nonwoven or a foam. Since the device is configured here like a strip, material can be saved in comparison to a device configured with a full surface. The pressure loss with this arrangement is low since there are large interstices through which the stream can flow freely.

The device can be arranged in such a way that the hollow fibers can be separated into bundles. Here, a number of hollow fibers is encircled by the device, for instance, a yarn, thus forming individual chambers. This creates the possibility of a modular structure for the humidifier. The bundles can be individually replaced and can exhibit different properties, for instance, different diameters. Towards this end, hollow fibers having different diameters can be combined inside one bundle. Here, two hollow fibers of a smaller diameter can be combined with hollow fibers of a larger diameter. This configuration yields a stochastic, uniform distribution of hollow fibers having various diameters and accounts for a high porosity and a low pressure loss. In other embodiments, the bundles can contain different numbers of hollow fibers. This translates into bundles of different sizes and likewise results in a high porosity and a low pressure loss in an arrangement of the bundles.

The hollow fibers arranged in the chambers can have packing densities that differ from each other. The packing density can be adjusted by varying the thickness of the device. Thanks to the variable packing density, the pressure loss in the chamber can be adapted to the local dynamic pressure, so that, for instance, the chambers in areas of high dynamic pressure have a greater packing density than the chambers in areas of less dynamic pressure. Therefore, the mass transfer of the hollow fibers can be kept constant throughout all of the chambers.

The hollow fibers arranged in the chambers can have diameters that differ from each other. Owing to the variable diameter, the pressure loss in a chamber is likewise variable since the packing density and thus the pressure loss of the chamber increase as the diameter decreases.

The invention relates to a humidifier comprising at least one housing having a wall and at least one hollow fiber arrangement situated inside the housing. Here, the packing density of the hollow fibers is variable, so that it can be adapted to different pressure conditions.

The packing density of the hollow fibers can increase from the housing wall in the direction of the middle of the housing. As a result, the packing density is lowest in the inflow area of the hollow fiber arrangement and it increases in the direction of the middle of the housing. This translates into a uniform course of the pressure loss and a uniform mass transfer.

The housing can have an inlet opening through which the second air stream can be conducted to the hollow fibers and the hollow fibers can be arranged so as to be spaced at the smallest distance from each other in the area of the highest dynamic pressure and at the largest distance from each other in the area of the lowest dynamic pressure. In this context, the pressure loss is greatest in the area of the highest dynamic pressure and smallest in the area of the lowest dynamic pressure. This results in a uniform flow and thus in a uniform mass transfer over the cross section of the housing.

BRIEF DESCRIPTION OF THE DRAWINGS

Several embodiments of the hollow fiber arrangement according to the invention will be explained in greater detail below on the basis of the figures, which schematically show the following:

FIG. 5 a humidifier.

DETAILED DESCRIPTION

Figure 1:
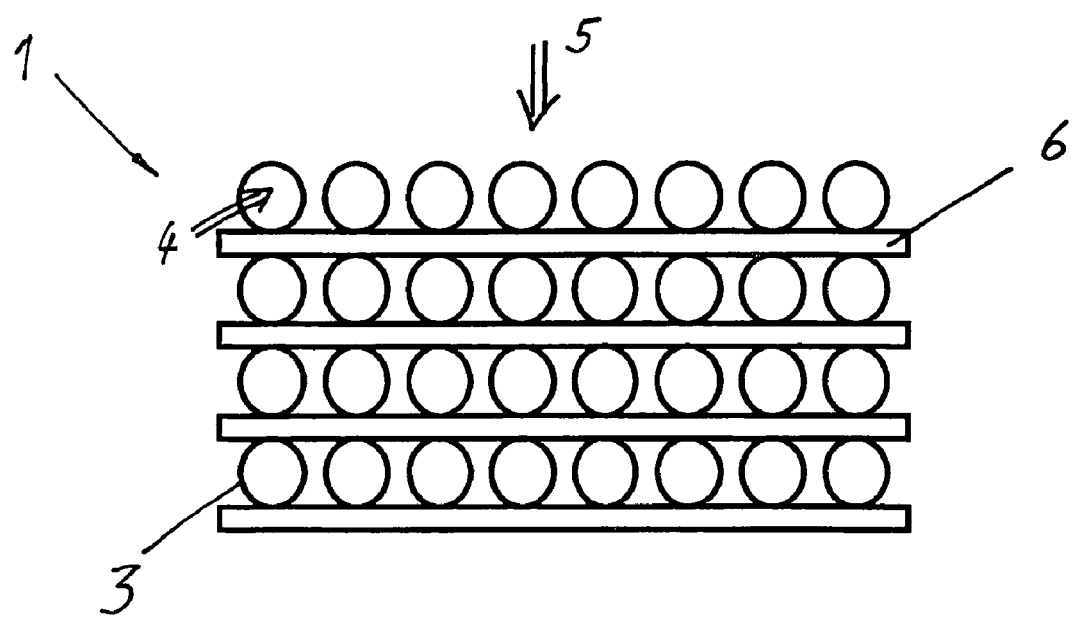
FIG. 1 a hollow fiber arrangement comprising a device consisting of a layer.

FIG. 1 shows a hollow fiber arrangement 1 that is particularly well-suited for a humidifier 2 of a fuel cell. The hollow fiber arrangement 1 is made up of hollow fibers 3 that are permeable to water-vapor, whereby a first air stream 4 can be conducted inside the hollow fibers 3 and a second air stream 5 can be conducted outside of the hollow fibers 3. The hollow fibers 3 are spaced at a distance from each other by a device 6. In this embodiment, the device 6 is in the form of a flat web of nonwoven material arranged perpendicular to the second air stream 5. The web of nonwoven material consists of synthetic fibers joined to each other in such a way that the forward resistance is low. In other embodiments, the device 6 can be also made of an open-cell foam, especially a polyurethane foam.

Figure 2:
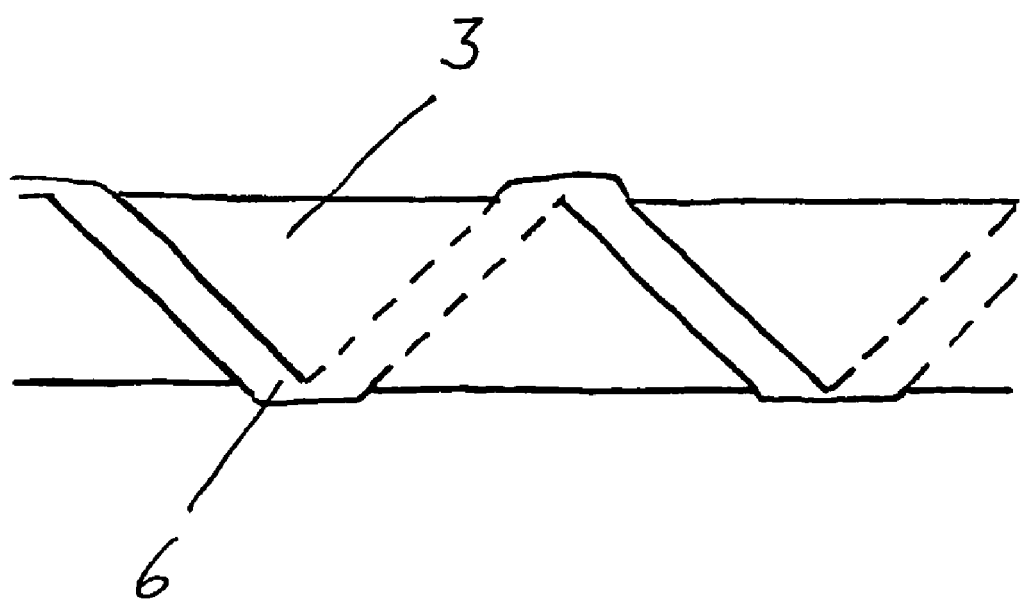
FIG. 2 a hollow fiber arrangement comprising a device consisting of a strip that surrounds the hollow fiber like a spiral.

FIG. 2 shows a hollow fiber 3 that is surrounded like a spiral by the device 6. The device 6 consists of a narrow strip of nonwoven material.

Figure 3:
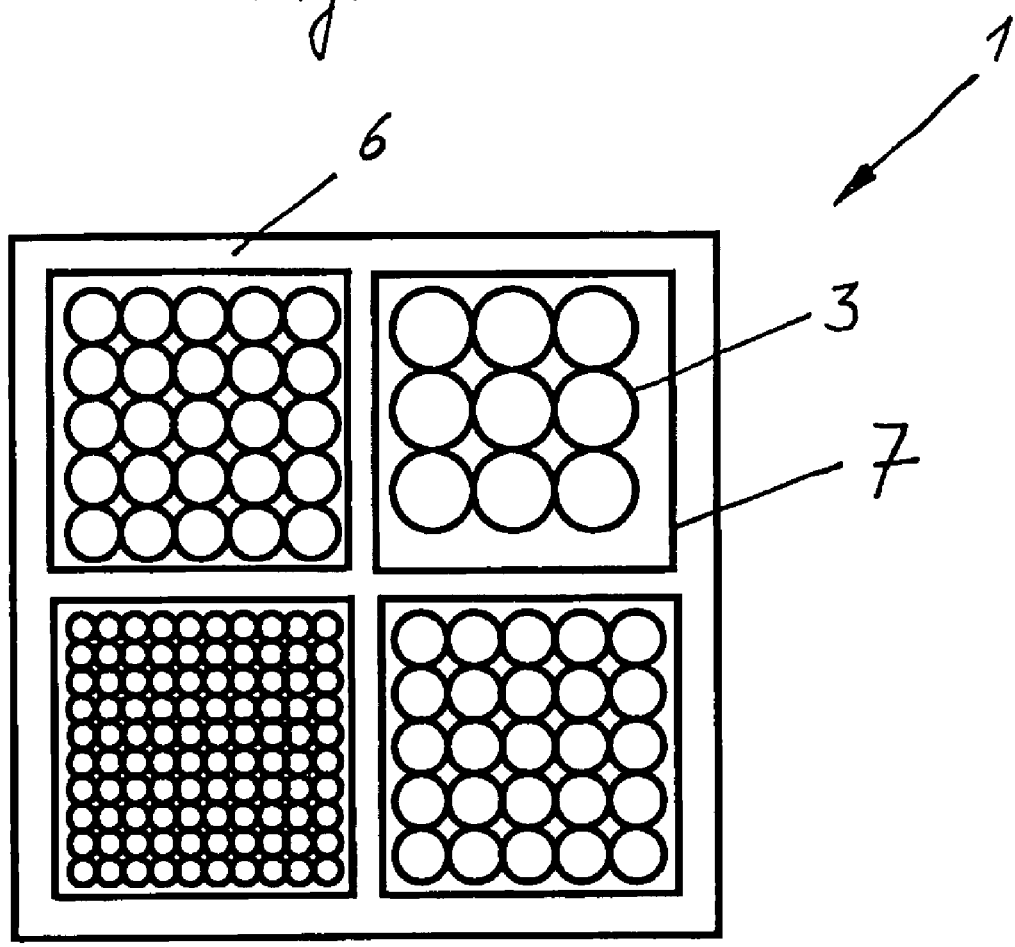
FIG. 3 a hollow fiber arrangement with hollow fibers arranged in chambers.

FIG. 3 shows a hollow fiber arrangement 1 in which the device 6 is arranged in such a way that the hollow fibers 3 are separated into bundles 7. Here, each device 6 surrounds a number of hollow fibers 3, whereby in this embodiment, the device 6 is formed by a dimensionally stable nonwoven or by an open-cell foam. In other embodiments, the device can also be made of other porous materials such as perforated plates, screens, plastic sieves. The hollow fibers 3 arranged into the bundles 7 in the chambers have different packing densities. This is done by selecting hollow fibers 3 having different diameters and by additional devices 6 such as for example, nonwoven strips that surround the hollow fibers 3 like a spiral or by a combination of different diameters and additional devices 6.

Figure 4:
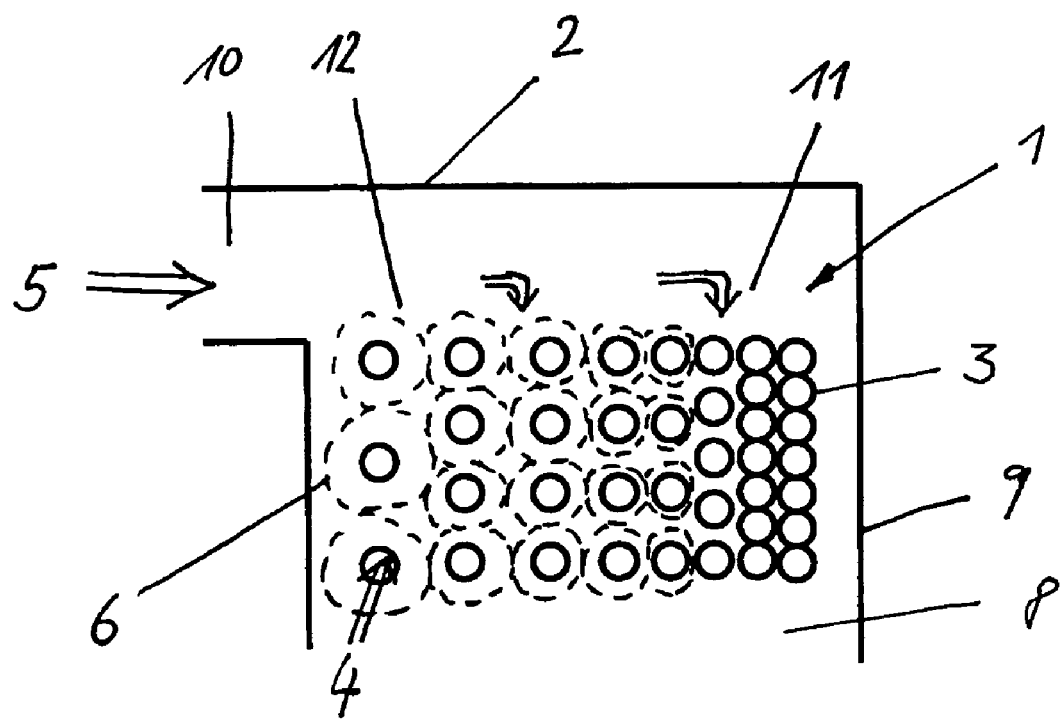
FIG. 4 a humidifier with an asymmetrical inflow.

FIG. 4 shows a humidifier 2 formed by a housing 8 with a wall 9, whereby a hollow fiber arrangement 1 according to FIG. 1 is arranged in said housing. In this embodiment, the device 6 consists of a spiral-shaped strip. The housing 8 has an inlet opening 10 through which the second air stream 5 can be conducted to the hollow fibers 3. The hollow fibers 3 are arranged so as to be at the smallest distance from each other in the area of the highest dynamic pressure 11 and at the largest distance from each other in the area of the lowest dynamic pressure 12.

FIG. 5 shows a humidifier 2 formed by a housing 8 with a wall 9, whereby a hollow fiber arrangement 1 according to FIG. 1 is arranged in said housing. In this embodiment, the device 6 consists of a flat structure. The hollow fibers 3 are arranged in the housing in such a way that the packing density of the hollow fibers 3 increases from the housing wall 9 in the direction of the middle of the housing.

The invention claimed is:

1. A hollow fiber arrangement for a humidifier, comprising hollow fibers permeable to water-vapor,
    whereby a first air stream can be conducted inside the hollow fibers and a second air stream can be conducted outside of the hollow fibers,
    wherein the hollow fibers are spaced at least in part at a distance from each other by a spacing device arranged between the hollow fibers, and
    wherein the hollow fibers arranged in chambers have packing densities that differ from each other.

2. The hollow fiber arrangement as recited in claim 1, wherein the spacing device comprises a nonwoven.

3. The hollow fiber arrangement as recited in claim 1 wherein the spacing device has an open-cell structure.

4. The hollow fiber arrangement as recited in claim 1, wherein the spacing device comprises a material that surrounds the hollow fibers like a spiral.

5. The hollow fiber arrangement as recited in claim 1, wherein the spacing device is arranged in such as way that the hollow fibers can be separated into bundles.

6. A hollow fiber arrangement for a humidifier, comprising hollow fibers permeable to water-vapor,
    whereby a first air stream can be conducted inside the hollow fibers and a second air stream can be conducted outside of the hollow fibers,
    wherein the hollow fibers are spaced at least in part at a distance from each other by a spacing device arranged between the hollow fibers, and
    wherein the hollow fibers arranged in the chambers have diameters that differ from each other.

7. A humidifier comprising at least one housing having a wall and at least one hollow fiber arrangement situated inside the housing,
    wherein said arrangement comprises hollow fibers permeable to water-vapor, whereby a first air stream can be conducted inside the hollow fibers and a second air stream can be conducted outside of the hollow fibers,
    wherein the hollow fibers are spaced at least in part at a distance from each other by a spacing device arranged between the hollow fibers,
    wherein the packing density of the hollow fibers increases from the housing wall in the direction of the middle of the housing.

8. A humidifier comprising at least one housing having a wall and at least one hollow fiber arrangement situated inside the housing,
    wherein said arrangement comprises hollow fibers permeable to water-vapor, whereby a first air stream can be conducted inside the hollow fibers and a second air stream can be conducted outside of the hollow fibers,
    wherein the hollow fibers are spaced at least in part at a distance from each other by a spacing device arranged between the hollow fibers,
    wherein the housing has an inlet opening through which the second air stream can be conducted to the hollow fibers and in that the hollow fibers are arranged so as to be spaced at the smallest distance from each other in the area of the highest dynamic pressure and at the largest distance from each other in the area of the lowest dynamic pressure.

9. The hollow fiber arrangement as recited in claim 6, wherein the spacing device comprises a nonwoven.

10. The hollow fiber arrangement as recited in claim 6, wherein the spacing device has an open-cell structure.

11. The hollow fiber arrangement as recited in claim 6, wherein the spacing device comprises a material that surrounds the hollow fibers like a spiral.

12. The hollow fiber arrangement as recited in claim 6, wherein the spacing device is arranged in such a way that the hollow fibers can be separated into bundles.

13. The hollow fiber arrangement as recited in claim 7, wherein the spacing device comprises a nonwoven.

14. The hollow fiber arrangement as recited in claim 7, wherein the spacing device has an open-cell structure.

15. The hollow fiber arrangement as recited in claim 7, wherein the spacing device comprises a material that surrounds the hollow fibers like a spiral.

16. The hollow fiber arrangement as recited in claim 7, wherein the spacing device is arranged in such a way that the hollow fibers can be separated into bundles.

17. The hollow fiber arrangement as recited in claim 8, wherein the spacing device comprises a nonwoven.

18. The hollow fiber arrangement as recited in claim 8, wherein the spacing device has an open-cell structure.

19. The hollow fiber arrangement as recited in claim 8, wherein the spacing device comprises a material that surrounds the hollow fibers like a spiral.

20. The hollow fiber arrangement as recited in claim 8, wherein the spacing device is arranged in such a way that the hollow fibers can be separated into bundles.

* * * * *